(12) United States Patent
Nam et al.

(10) Patent No.: US 11,279,460 B1
(45) Date of Patent: Mar. 22, 2022

(54) ROTATING GAS INJECTION DEVICE FOR PREVENTING DAMAGE TO RAWINSONDE BALLOON

(71) Applicant: National Institute of Meteorological Sciences, Seogwipo-si (KR)

(72) Inventors: Hyoung Gu Nam, Gangneung-si (KR); Hyun Uk Kim, Gangneung-si (KR); Hae Min Kim, Gangneung-si (KR); Geon Tae Kim, Gangneung-si (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 0 days.

(21) Appl. No.: 17/403,372

(22) Filed: Aug. 16, 2021

(30) Foreign Application Priority Data

Sep. 22, 2020 (KR) .................. 10-2020-0122108

(51) Int. Cl.
*B64B 1/58* (2006.01)
*G01W 1/08* (2006.01)

(52) U.S. Cl.
CPC ............... *B64B 1/58* (2013.01); *G01W 1/08* (2013.01)

(58) Field of Classification Search
CPC .... B64B 1/58; B64B 1/62; B64B 1/64; B64B 1/40; A63H 27/10; A63H 27/1091; A63H 27/1083; G01W 1/08
See application file for complete search history.

(56) References Cited

U.S. PATENT DOCUMENTS

| | | | | |
|---|---|---|---|---|
| 2,207,212 A | * | 7/1940 | Arey | B60C 5/20 152/342.1 |
| 2,403,801 A | * | 7/1946 | Isom | B64B 1/58 251/353 |
| 2,409,486 A | * | 10/1946 | Hagen | B64B 1/58 244/31 |
| 2,455,248 A | * | 11/1948 | Hagen | B64B 1/40 244/31 |
| 2,919,725 A | * | 1/1960 | Mastenbrook | H01Q 1/082 141/48 |
| 3,047,252 A | * | 7/1962 | Huch | B64B 1/58 244/31 |
| 3,452,949 A | * | 7/1969 | Bassett | B64B 1/40 244/31 |

(Continued)

FOREIGN PATENT DOCUMENTS

JP 10244995 9/1998

*Primary Examiner* — Medhat Badawi
(74) *Attorney, Agent, or Firm* — David R. Stevens; Stevens Law Group (57) ABSTRACT

A rotating gas injection device for preventing damage to a rawinsonde balloon, comprising: a handgrip part; a gas injection tube; a ball bearing module including an inner ring, an outer ring, wherein the inner ring and the outer ring are rotatably engaged by means of the balls; and an outer ring cover positioned outside of the outer ring to form space between the outer ring cover and the outer ring; wherein, after an insertion of a neck of the rawinsonde balloon into the space, a distance between the outer ring and the outer ring cover is controlled to be decreased so that the neck of the rawinsonde balloon makes tight contact, and in response to an external force exerted on the neck of the rawinsonde, the outer ring is allowed to be rotated together with the neck by means of the balls.

5 Claims, 5 Drawing Sheets

(56) References Cited

U.S. PATENT DOCUMENTS

| | | | | |
|---|---|---|---|---|
| 3,608,849 A * | 9/1971 | Underwood | B64B 1/58 | 244/31 |
| 3,856,186 A * | 12/1974 | Hay | B60R 21/08 | 222/402.16 |
| 4,277,688 A * | 7/1981 | Yamamoto | G21F 5/008 | 250/506.1 |
| 4,494,714 A * | 1/1985 | Hill | B64B 1/58 | 116/210 |
| 4,564,159 A * | 1/1986 | Hill | B64B 1/58 | 116/210 |
| 5,297,763 A * | 3/1994 | Cazort | B64B 1/58 | 244/31 |
| 5,776,291 A * | 7/1998 | Lang | A63H 27/10 | 156/290 |
| 6,119,977 A * | 9/2000 | Steele | B64B 1/02 | 244/30 |
| 6,186,620 B1 * | 2/2001 | Hsieh | B41J 2/17513 | 347/84 |
| 7,344,267 B2 * | 3/2008 | Carito | A63H 27/10 | 362/189 |
| 7,490,794 B2 * | 2/2009 | Heaven, Jr. | B64B 1/06 | 244/125 |
| 7,686,668 B1 * | 3/2010 | Butler | A63H 27/10 | 446/220 |
| 7,708,222 B2 * | 5/2010 | Lee | B64B 1/56 | 244/30 |
| 7,997,264 B2 * | 8/2011 | Sankrithi | H01L 31/0547 | 126/697 |
| 8,052,082 B1 * | 11/2011 | Herlik | B64B 1/08 | 244/30 |
| 8,091,826 B2 * | 1/2012 | Voorhees | B64B 1/58 | 244/97 |
| 8,505,847 B2 * | 8/2013 | Ciampa | B64B 1/02 | 244/30 |
| 8,596,571 B2 * | 12/2013 | Goelet | B64B 1/06 | 244/30 |
| 8,833,696 B1 * | 9/2014 | Teller | B64B 1/40 | 244/96 |
| 9,027,877 B1 * | 5/2015 | Brookes | B64B 1/58 | 244/98 |
| 9,193,480 B2 * | 11/2015 | Smith | B64D 45/02 | |
| 9,266,599 B1 * | 2/2016 | Ratner | B64B 1/40 | |
| 9,371,124 B2 * | 6/2016 | Brookes | B64B 1/58 | |
| 9,463,861 B2 * | 10/2016 | Smith | B64D 45/02 | |
| 9,463,863 B1 * | 10/2016 | Roach | B64B 1/58 | |
| 9,573,671 B1 * | 2/2017 | Roach | A63H 27/10 | |
| 9,845,140 B2 * | 12/2017 | Crites | B29C 66/843 | |
| 9,845,141 B2 * | 12/2017 | Sehnert | B64B 1/30 | |
| 9,889,941 B1 * | 2/2018 | Erickson | B64C 39/024 | |
| 9,963,216 B1 * | 5/2018 | Fourie | B29C 65/08 | |
| 10,124,875 B1 * | 11/2018 | Farley | B64B 1/40 | |
| 10,336,432 B1 * | 7/2019 | Farley | B64B 1/40 | |
| 10,717,017 B2 * | 7/2020 | Publicover | B05B 9/0403 | |
| 11,001,379 B2 * | 5/2021 | Panas | H04L 67/10 | |
| 11,162,596 B1 * | 11/2021 | Davis | F16K 31/44 | |
| 2005/0236519 A1 * | 10/2005 | Handley | B64B 1/06 | 244/97 |
| 2007/0095424 A1 * | 5/2007 | Powell | B65B 31/02 | 141/114 |
| 2008/0078883 A1 * | 4/2008 | de Jong | B64G 1/222 | 244/158.3 |
| 2009/0047864 A1 * | 2/2009 | Burchett | A63H 27/10 | 446/224 |
| 2010/0243121 A1 * | 9/2010 | Eigenbrode | B60C 23/135 | 152/419 |
| 2013/0032665 A1 * | 2/2013 | Lu | B64C 25/52 | 244/100 A |
| 2013/0146174 A1 * | 6/2013 | Zinn | B65B 3/06 | 141/2 |
| 2014/0001308 A1 * | 1/2014 | Costa Duarte Pardal | B64B 1/66 | 244/29 |
| 2014/0060174 A1 * | 3/2014 | McCormick | G01W 1/08 | 73/170.28 |
| 2014/0158823 A1 * | 6/2014 | Smith | B64B 1/44 | 244/1 A |
| 2014/0360660 A1 * | 12/2014 | Latham | B64B 1/58 | 156/269 |
| 2015/0360763 A1 * | 12/2015 | Smith | B64D 45/02 | 244/30 |
| 2015/0367928 A1 * | 12/2015 | Crites | B29D 22/04 | 244/31 |
| 2016/0207605 A1 * | 7/2016 | Jensen | B64B 1/40 | |
| 2016/0221661 A1 * | 8/2016 | Bohannon | B29C 66/73921 | |
| 2017/0368464 A1 * | 12/2017 | Publicover | B05B 9/0403 | |
| 2018/0050797 A1 * | 2/2018 | Palmer | B64C 39/024 | |
| 2019/0039709 A1 * | 2/2019 | Crites | B29C 48/08 | |
| 2020/0152024 A1 * | 5/2020 | Fitzgerald | B64B 1/40 | |

* cited by examiner

ROTATING GAS INJECTION DEVICE FOR PREVENTING DAMAGE TO RAWINSONDE BALLOON

CROSS REFERENCE TO RELATED APPLICATION

This patent application claims the benefit and priority of Korean Patent Application No. 10-2020-0122108 filed on Sep. 22, 2020, the disclosure of which is incorporated by reference herein in its entirety as part of the present application.

FIELD OF THE DISCLOSURE

The present disclosure relates to a rotating gas injection device for preventing damage to a rawinsonde balloon; more specifically, for preventing damage due to a contortion of the rawinsonde balloon caused by strong winds while gas is being injected into the rawinsonde balloon during inclement weather.

BACKGROUND OF THE DISCLOSURE

Securing observational data, such as upper air's temperature, humidity, and wind speed and its direction, is essential in forecasting weather and identifying natural disasters. Currently, using a rawinsonde balloon is the only way to secure highly reliable data among devices capable of acquiring the observational data in the upper air.

A rawinsonde can secure the observational data such as upper air's temperature, humidity, and wind speed and its direction by mounting a temperature sensor, a humidity sensor, and a GPS sensor thereon and elevating them owing to an injection of helium thereinto. Herein, the GPS sensor is used to calculate the wind speed and its direction.

Conventionally, when the helium is injected into the rawinsonde balloon during inclement weather, the strong winds will cause the rawinsonde balloon to rotate while it is being inflated. As a result, a contortion to a neck of the rawinsonde balloon may happen and thus damage the rawinsonde balloon. Herein, since the damaged rawinsonde balloon and the already-injected helium cannot be reused, there is an issue of increased observational costs.

Accordingly, there is a need for a rotating gas injection device to prevent the contortion of the rawinsonde balloon caused by the strong winds while the gas is being injected into the rawinsonde balloon during the inclement weather.

SUMMARY OF THE DISCLOSURE

It is an object of the present disclosure to solve all of the aforementioned problems.

It is another object of the present disclosure to prevent incurrence of unnecessary costs by preventing damage to a rawinsonde balloon.

It is still another object of the present disclosure to decrease manpower consumption by reducing manpower required to jointly hold the rawinsonde balloon in order to prevent the damage to the rawinsonde balloon.

In order to achieve the above objects and achieve the desired results that will be introduced hereinafter, the configuration of the present disclosure is as follows:

In accordance to one aspect of the present disclosure, there is provided a rotating gas injection device for preventing damage to a rawinsonde balloon, including: a handgrip part for gripping the rotating gas injection device when gas is injected into the rawinsonde balloon; a gas injection tube, inwardly passing through the handgrip part, for injecting the gas into the rawinsonde balloon, wherein at least part of the gas injection tube is outwardly exposed from the handgrip part; a ball bearing module including an inner ring, an outer ring, and balls located between the inner ring and the outer ring, wherein the inner ring and the outer ring are rotatably engaged by means of the balls, and the inner ring is combined with at least part of a specific portion of the gas injection tube that is outwardly exposed from the handgrip part; and an outer ring cover positioned outside of the outer ring to form space between the outer ring cover and the outer ring, wherein a volume of the space is controllable; wherein, after an insertion of a neck of the rawinsonde balloon into the space formed between the outer ring and the outer ring cover, a distance between the outer ring and the outer ring cover is controlled to be decreased so that the neck of the rawinsonde balloon makes tight contact with both the outer ring and the outer ring cover, and after the tight contact is made, in response to an external force exerted on the neck of the rawinsonde balloon while the gas is being injected into the rawinsonde balloon, the outer ring is allowed to be rotated together with the neck by means of the balls with the gas injection tube serving as a rotation axis.

As one example, the outer ring cover includes a first outer ring cover to an n-th outer ring cover, wherein, after the insertion of the neck of the rawinsonde balloon into the space formed between the outer ring and the outer ring cover, the distance between the outer ring and the outer ring cover is controlled to be decreased so that the neck of the rawinsonde balloon makes tight contact with both the outer ring and the outer ring cover, by using (i) a first uniting structure for combining each ring cover and its adjacent ring cover among the first outer ring cover to the n-th outer ring cover and (ii) a second uniting structure for engaging (ii-1) at least one first portion formed on an interior of the outer ring cover and (ii-2) at least one second portion formed on an exterior of the outer ring.

As one example, both the outer ring and the outer ring cover are spaced apart from the handgrip part by a predetermined distance.

As one example, indentations are made on an exterior of the handgrip part to prevent slipping.

As one example, one circumferential end of the outer ring cover facing the rawinsonde balloon is formed in a round shape to prevent damage to a body of the rawinsonde balloon.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE
PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

Figure 1A:
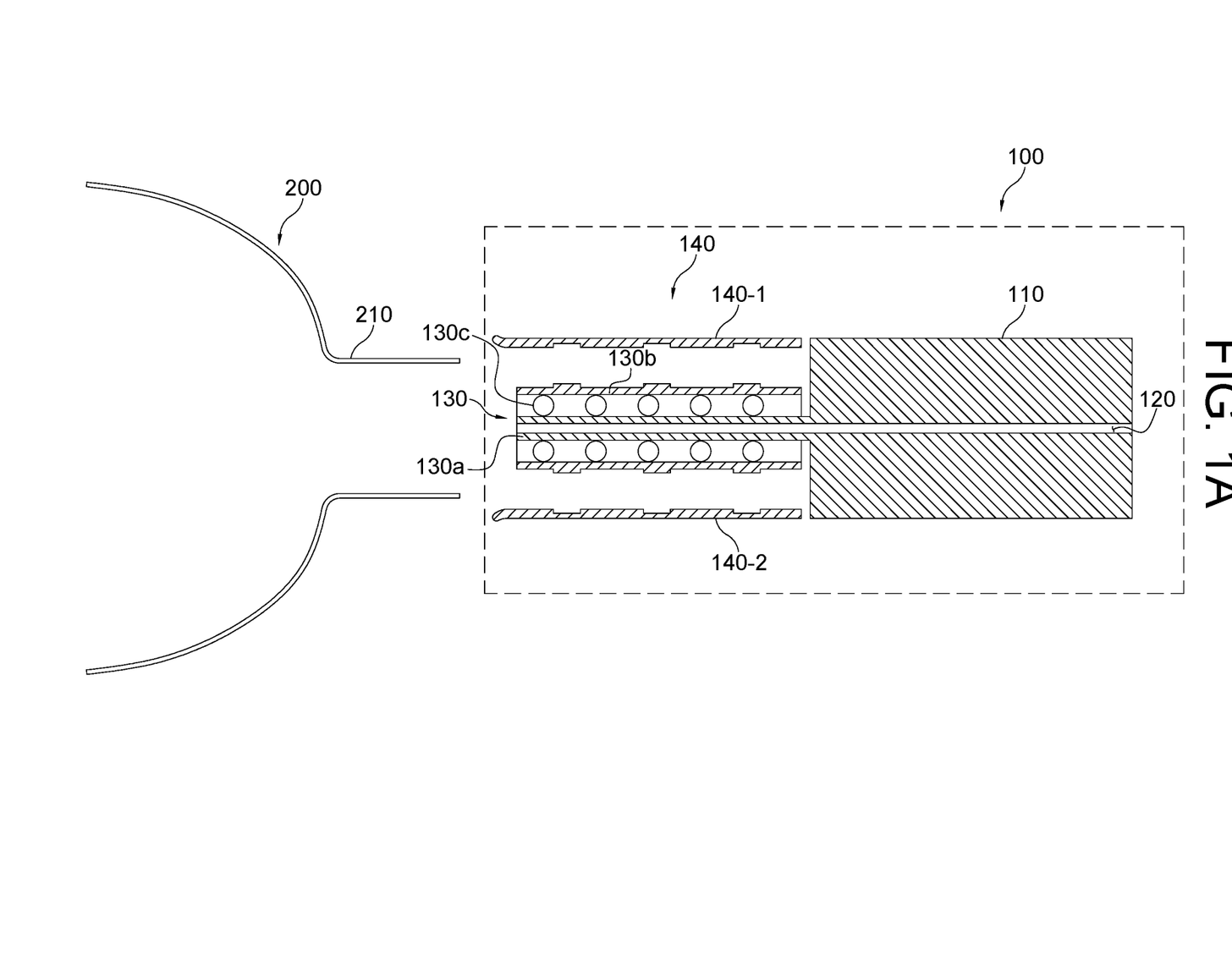
FIG. 1A and FIG. 1B are respectively a side cross-sectional view and a front cross-sectional view of a rotating gas injection device in accordance with one example embodiment of the present disclosure.
Figure 1B:
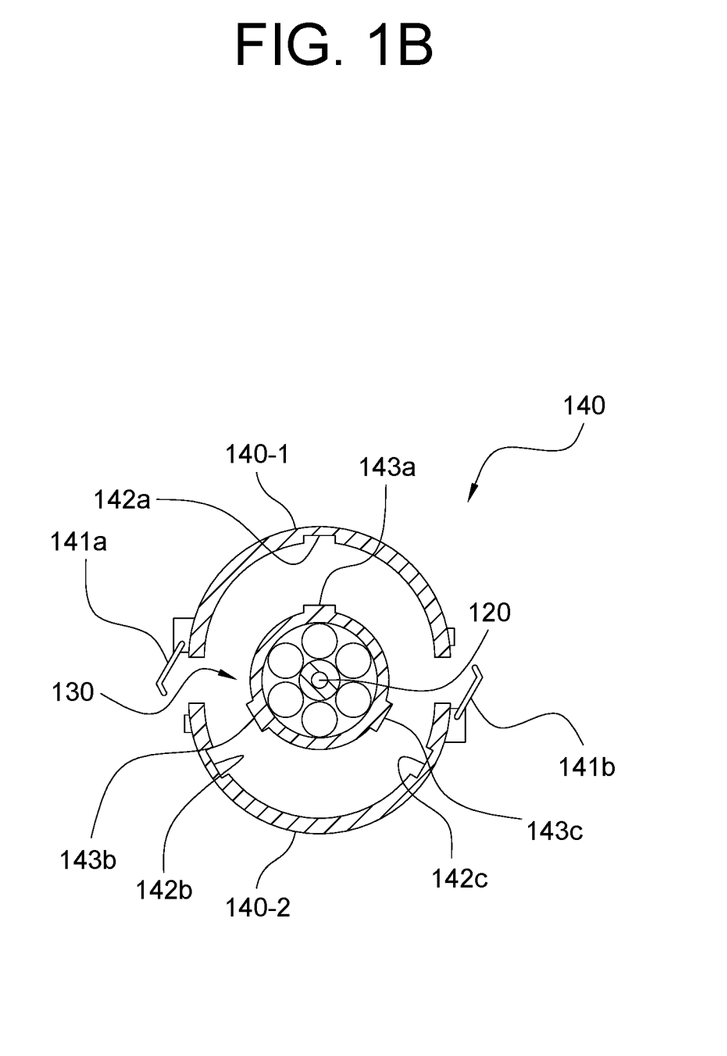

FIG. 1A and FIG. 1B are respectively a side cross-sectional view and a front cross-sectional view of a rotating gas injection device in accordance with one example embodiment of the present disclosure.

As shown in FIG. 1A and FIG. 1B, the rotating gas injection device 100 may include a handgrip part 110, a gas injection tube 120, a ball bearing module 130 and an outer ring cover 140. Herein, the rotating gas injection device 100 may be made of corrosion resistant material such as stainless steel, but it is not limited thereto. Also, the rotating gas injection device 100 may be polished to prevent damage to a rawinsonde balloon 200.

First, the handgrip part 110 of the rotating gas injection device 100 can be grasped while gas is being injected into the rawinsonde balloon 200.

As one example, indentations are made on the handgrip part 110 to prevent slipping when the rotating gas injection device 100 is grasped, but it is not limited thereto, and a variety of structures (for instance, honeycomb structure, or a structure with rubber paddings, etc.) may be used to prevent the slipping.

Herein, the gas injected into the rawinsonde balloon 200 may be helium, which can elevate the rawinsonde balloon 200 into atmosphere, but it is not limited thereto.

Further, the gas injection tube 120 of the rotating gas injection device 100 is inwardly passing through the handgrip part 110 and at least part of the gas injection tube 120 is outwardly exposed from the handgrip part 110. The gas injection tube 120 can allow the gas to be injected into the rawinsonde balloon 200.

As one example, in order to prevent gas leakage due to a damage to an exterior of the gas injection tube 120 that is outwardly exposed from the handgrip part 110, the exterior of the gas injection tube 120 may be made of hard materials such as stainless steel, aluminum alloy, but it is not limited thereto.

Furthermore, the ball bearing module 130 includes an inner ring 130a, an outer ring 130b, and balls 130c, which are located between the inner ring 130a and the outer ring 130b. Herein, the inner ring 130a and the outer ring 130b are rotatably engaged by means of the balls, and the inner ring 130a is combined with at least part of a specific portion of the gas injection tube 120 that is outwardly exposed from the handgrip part 110.

As one example, the specific portion of the gas injection tube 120 that is outwardly exposed from the handgrip part 110 may be of a diameter sized to fit with the inner ring 130a to thereby allow the inner ring 130a of the ball bearing module 130 to be combined therewith. Even if at least part of the specific portion of the gas injection tube 120 that is outwardly exposed from the handgrip part 110 is not of the diameter sized to fit with the inner ring 130a, it may be combined with the inner ring 130a to withstand strong winds and may be of a shape such that the connection between the inner ring 130a and the gas injection tube 120 is not broken.

Also, because the inner ring 130a and the outer ring 130b are rotatably engaged by means of the balls 130c, the inner ring 130a and the outer ring 130b can rotate relative to each other.

Moreover, the outer ring cover 140 is positioned outside of the outer ring 130b to form space between the outer ring cover 140 and the outer ring 130b. Herein, a volume of the space is controllable.

In detail, the outer ring cover 140 may include a first outer ring cover to an n-th outer ring cover. The first outer ring cover to the n-th outer ring cover may be combined to form the outer ring cover 140, and although FIG. 1A and FIG. 1B only illustrate the outer ring cover 140 by combining the first outer ring cover 140-1 and a second outer ring cover 140-2, this is merely an example, and the shapes and the number of covers are not limited thereto. As another example, a single outer ring cover may be assumed.

Further, a separate mechanism (not illustrated) for adjusting the volume of the space formed between the outer ring cover 140 and the outer ring 130b is required.

Meanwhile, if a circumferential end of the outer ring cover 140 facing the rawinsonde balloon is formed in a sharp shape, then the circumferential end could damage the rawinsonde balloon on contact, therefore, the circumferential end of the outer ring cover 140 facing the rawinsonde balloon may be formed in a round shape to prevent damage to a body of the rawinsonde balloon.

Subsequently, the structure for preventing damage to a neck 210 of the rawinsonde balloon 200 will be explained.

First, the outer ring cover 140 is positioned in a vicinity of the outer ring 130b to thereby form the space between the outer ring cover 140 and the outer ring 130b. Thereafter, the neck of the rawinsonde balloon 200 is inserted into the space formed between the outer ring cover 140 and the outer ring 130b. Next, a distance between the outer ring 130b and the outer ring cover 140 is controlled to be decreased so that the neck of the rawinsonde balloon makes tight contact with both the outer ring 130b and the outer ring cover 140. Herein, with the tight contact made, in response to an external force exerted on the neck 210 of the rawinsonde balloon 200 while the gas is being injected into the rawinsonde balloon 200, the outer ring 130b is allowed to be rotated together with the neck 210 by means of the balls 130c with the gas injection tube 120 serving as a rotation axis. Since both the neck 210 and the outer ring 130b can rotate together, a contortion to the neck is prevented even when the external force is applied, thus, the damage to the neck 210 is prevented Subsequently, uniting structures of the outer ring 130b and the outer ring cover 140 of the rotating gas injection device 100 will be described in more detail.

By referring to FIG. 1B, the outer ring cover 140 includes a first uniting structure for combining each ring cover and its adjacent ring cover among the first outer ring cover to the n-th outer ring cover. Herein, the first uniting structure may be clasps, catches, or hooks for fastening. As one example, the outer ring cover 140 may be a structure capable of combining the first outer ring cover 140-1 and the second outer ring cover 140-2 by using catches 141a and 141b.

Further, the rotating gas injection device 100 may include a second uniting structure for engaging (i) at least one first portion formed on an interior of the outer ring cover 140 and (ii) at least one second portion formed on an exterior of the outer ring 130b. Herein, the second uniting structure may be a structure in which the first portion and the second portion have interconnecting profiles corresponding to each other. As one illustrated example of FIG. 1B, the rotating gas injection device 100 has outwardly rectangular interconnecting profiles 143a, 143b, and 143c formed on the exterior of the outer ring 130b and their corresponding inwardly rectangular interconnecting profiles 142a, 142b, and 142c formed on the interior of the outer ring cover 140, to thereby engage the outwardly rectangular interconnecting profiles 143a, 142b, and 143c and the inwardly rectangular interconnecting profiles 142a, 142b, and 142c together. Needless to say, the shape of the interconnecting profiles is not limited to rectangles, and a variety of modifications such as triangles may be assumed.

As a result, by using the first uniting structure and the second uniting structure, the distance between the outer ring 130b and the outer ring cover 140 is controlled to be decreased so that the neck 210 of the rawinsonde balloon 200 makes tight contact with both the outer ring 130b and the outer ring cover 140.

Furthermore, since the outer ring 130b and the outer ring cover 140 rotate together with the neck 210, friction may cause damage to the outer ring 130b and the outer ring cover 140 when the outer ring 130b and the outer ring cover 140 are combined or making contact with the handgrip part 110. Therefore, the outer ring 130b and the outer ring cover 140 may be spaced apart from the handgrip part 110 by a predetermined distance.

Figure 2A:
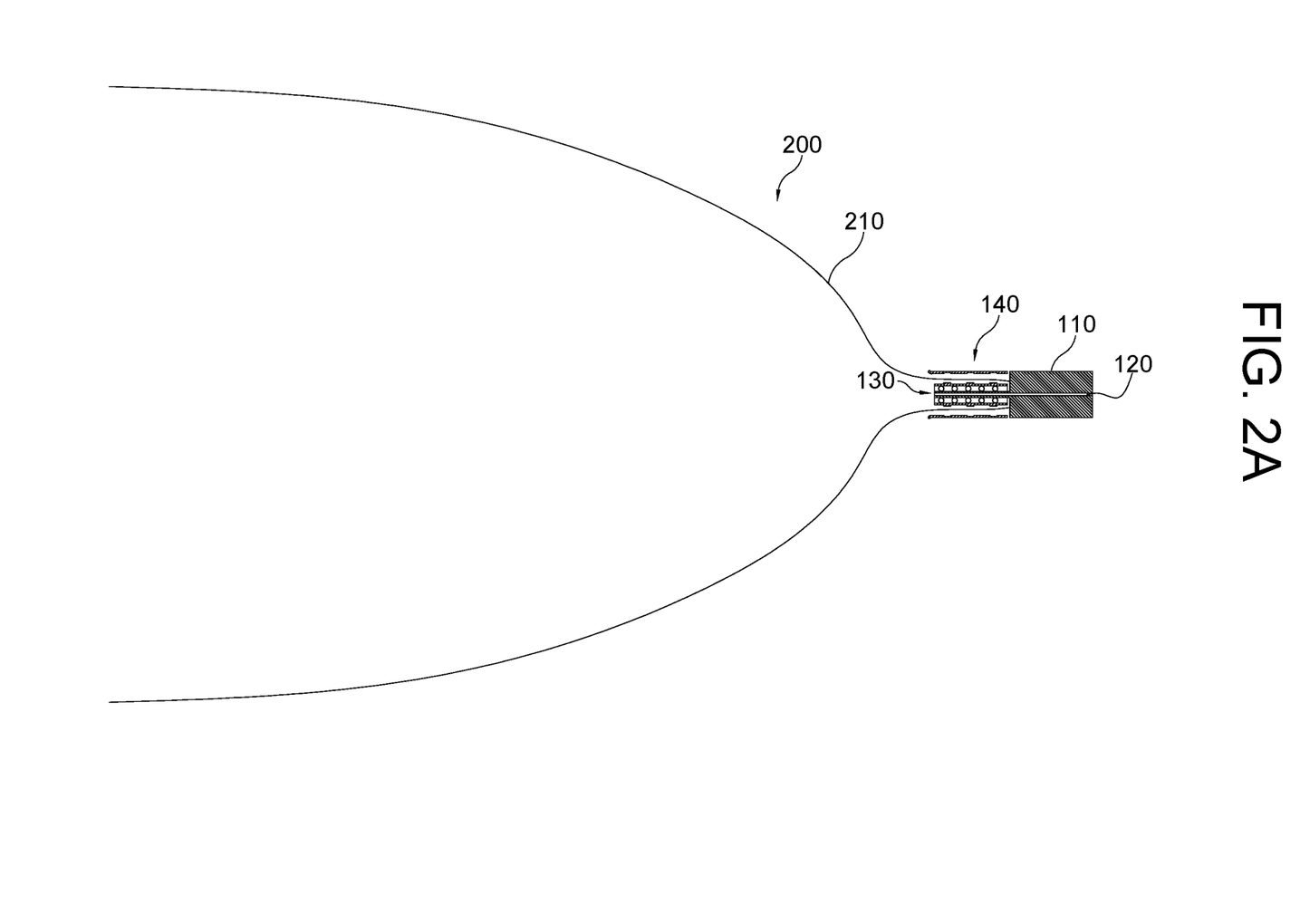
FIG. 2A and FIG. 2B are drawings respectively schematically illustrating the rawinsonde device before gas is injected and the rawinsonde device after the gas is injected by using the rotating gas injection device, in accordance with one example embodiment of the present disclosure.
Figure 2B:
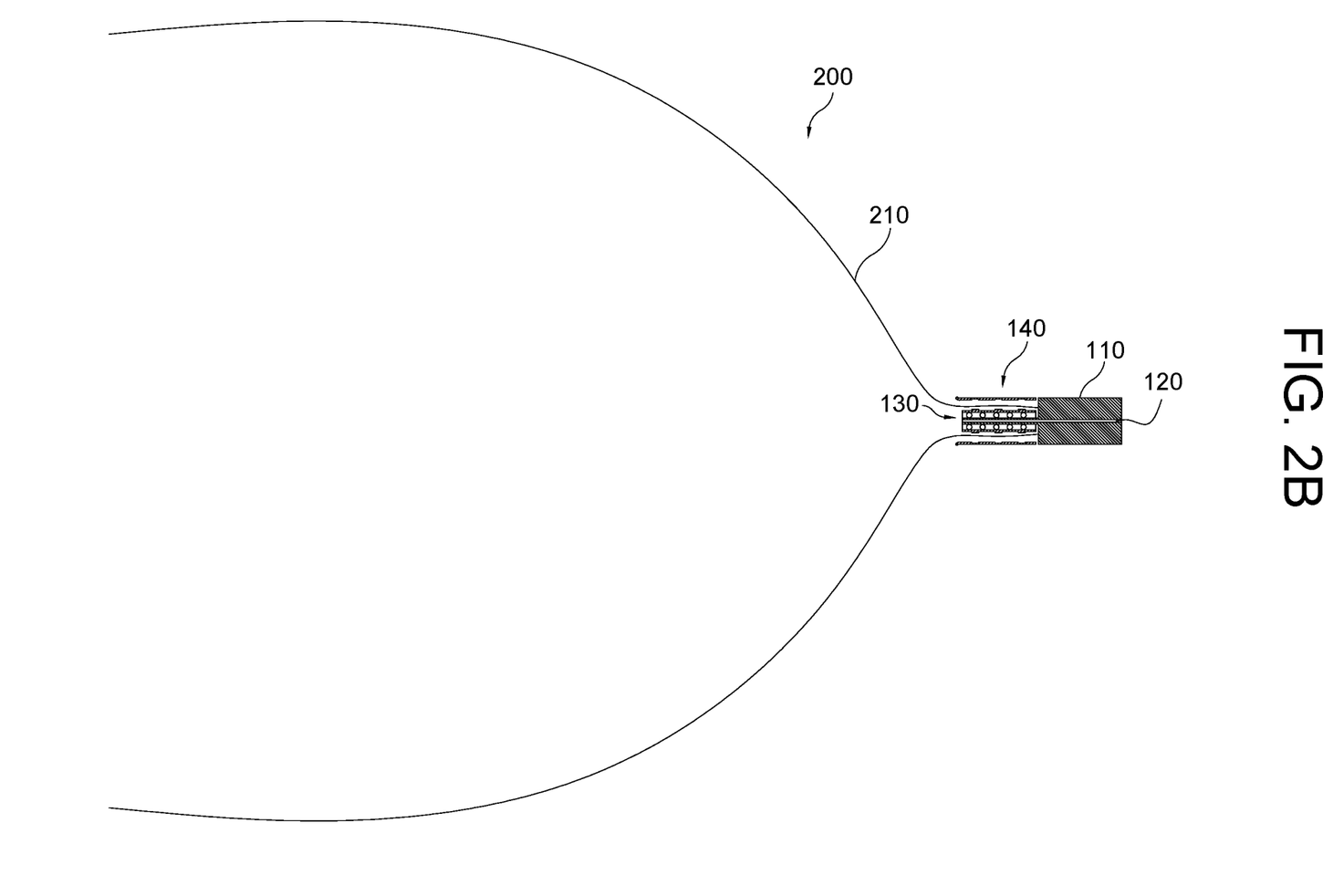

FIG. 2A and FIG. 2B are drawings respectively schematically illustrating the rawinsonde device 200 before gas is injected and the rawinsonde device 200 after gas is injected by using the rotating gas injection device 100 in accordance with one example embodiment of the present disclosure.

FIG. 2A is a drawing of the rawinsonde balloon 200 before the gas is injected, and FIG. 2B is a drawing of the rawinsonde balloon 200 after the gas is injected.

Figure 3:
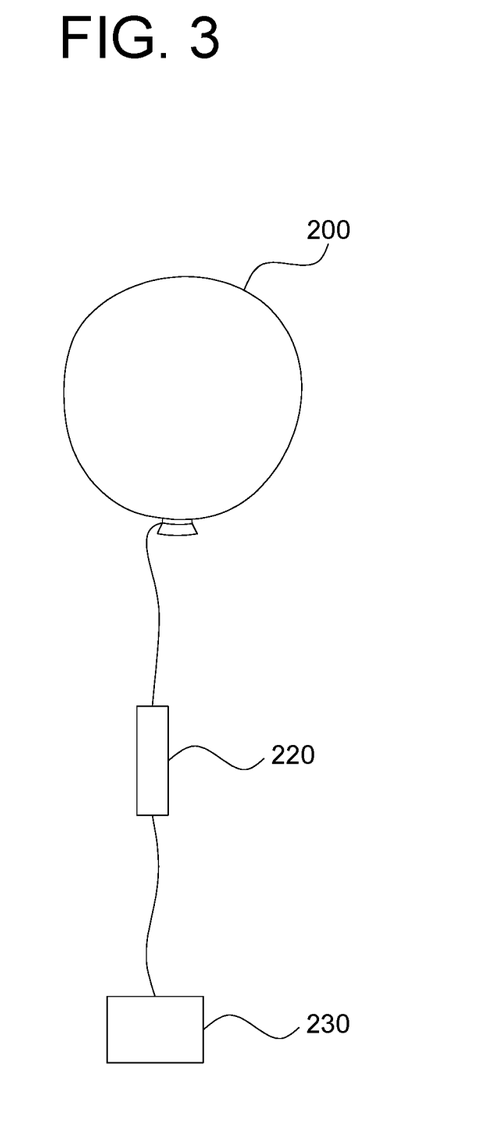
FIG. 3 is a drawing schematically illustrating a state of the rawinsonde device being elevated after the gas is injected in accordance with one example embodiment of the present disclosure.

FIG. 3 is a drawing schematically illustrating a state of the rawinsonde balloon 200 being elevated in accordance with one example embodiment of the present disclosure.

Referring to FIG. 3, the rawinsonde balloon 200 are elevated together with the weather observation sensors 230 and a reel 220 with a rope connecting the weather observation sensors 230 and the rawinsonde balloon 200.

The present disclosure has an effect of preventing incurrence of unnecessary costs by preventing the damage to the rawinsonde balloon.

The present disclosure has another effect of decreasing manpower consumption by reducing manpower required to jointly hold the rawinsonde balloon in order to prevent the damage to the rawinsonde balloon.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A rotating gas injection device for preventing damage to a rawinsonde balloon, comprising:
   a handgrip part for gripping the rotating gas injection device when gas is injected into the rawinsonde balloon;
   a gas injection tube, inwardly passing through the handgrip part, for injecting the gas into the rawinsonde balloon, wherein at least part of the gas injection tube is outwardly exposed from the handgrip part;
   a ball bearing module including an inner ring, an outer ring, and balls located between the inner ring and the outer ring, wherein the inner ring and the outer ring are rotatably engaged by means of the balls, and the inner ring is combined with at least part of a specific portion of the gas injection tube that is outwardly exposed from the handgrip part; and
   an outer ring cover positioned outside of the outer ring to form space between the outer ring cover and the outer ring, wherein a volume of the space is controllable;
   wherein, the outer ring and outer ring cover are configured such that after an insertion of a neck of the rawinsonde balloon into the space formed between the outer ring and the outer ring cover, a distance between the outer ring and the outer ring cover is controlled to be decreased so that the neck of the rawinsonde balloon makes tight contact with both the outer ring and the outer ring cover, and after the tight contact is made, in response to an external force exerted on the neck of the rawinsonde balloon while the gas is being injected into the rawinsonde balloon, the outer ring is allowed to be rotated together with the neck by means of the balls with the gas injection tube serving as a rotation axis.

2. The rotating gas injection device of claim 1, wherein the outer ring cover includes a first outer ring cover to an n-th outer ring cover, and wherein, after the insertion of the neck of the rawinsonde balloon into the space formed between the outer ring and the outer ring cover, the distance between the outer ring and the outer ring cover is controlled to be decreased so that the neck of the rawinsonde balloon makes tight contact with both the outer ring and the outer ring cover, by using (i) a first uniting structure for combining each ring cover and its adjacent ring cover among the first outer ring cover to the n-th outer ring cover and (ii) a second uniting structure for engaging (ii-1) at least one first portion formed on an interior of the outer ring cover and (ii-2) at least one second portion formed on an exterior of the outer ring.

3. The rotating gas injection device of claim 1, wherein both the outer ring and the outer ring cover are spaced apart from the handgrip part by a predetermined distance.

4. The rotating gas injection device of claim 1, wherein indentations are made on an exterior of the handgrip part to prevent slipping.

5. The rotating gas injection device of claim 1, wherein one circumferential end of the outer ring cover facing the rawinsonde balloon is formed in a round shape to prevent damage to a body of the rawinsonde balloon.

\* \* \* \* \*